June 20, 1961   B. COOPER   2,989,736
AUTOMATIC TOLL COLLECTOR HAVING A TOLL RATE SELECTING MEANS
Filed March 20, 1957   2 Sheets-Sheet 1

TO PLUNGER RELEASE ←

INVENTOR.
BENJAMIN COOPER
BY
J.B. Felshin
ATTORNEY.

June 20, 1961 B. COOPER 2,989,736
AUTOMATIC TOLL COLLECTOR HAVING A TOLL RATE SELECTING MEANS
Filed March 20, 1957 2 Sheets-Sheet 2
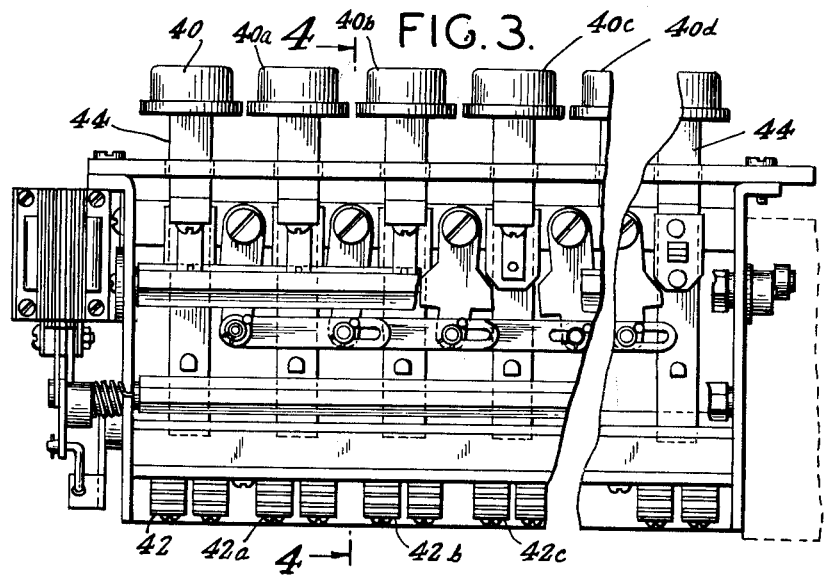
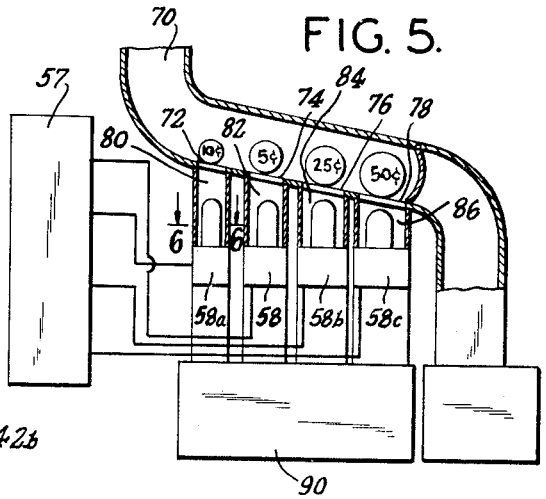
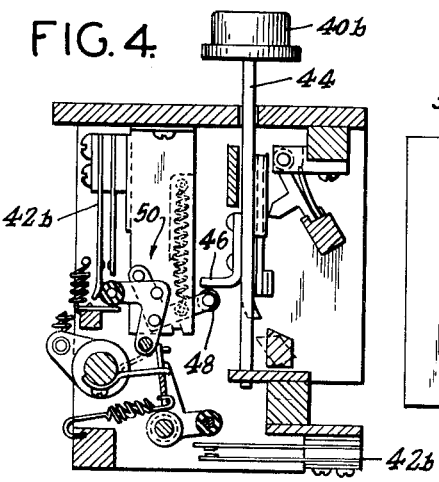
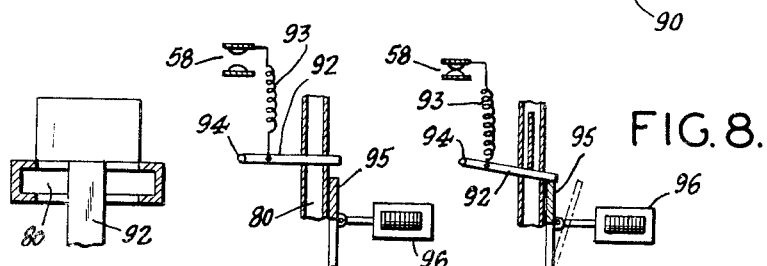
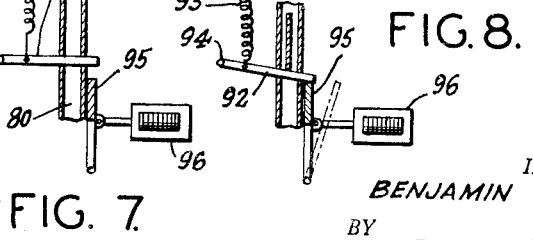
INVENTOR.
BENJAMIN COOPER
BY
*J. B. Felshin*
ATTORNEY.

United States Patent Office 2,989,736
Patented June 20, 1961

2,989,736
AUTOMATIC TOLL COLLECTOR HAVING A TOLL RATE SELECTING MEANS
Benjamin Cooper, 75 Front St., Brooklyn 1, N.Y.
Filed Mar. 20, 1957, Ser. No. 647,327
7 Claims. (Cl. 340—213)

This invention relates generally to toll checking systems and, in particular, to a toll checking system of the barrier type wherein a vehicle driver desiring to utilize a toll facility must approach and stop at a toll collection booth before entering the toll facility. Heretofore, the toll revenue was collected manually by a toll collector and manually registered by the collector utilizing a conventional toll registering device. With the advent of the super highway wherein many types of vehicles utilize the toll facility, the toll for each class of vehicle differs and, accordingly, a plurality of toll registering devices are provided. This may be in the form of a key box having a plurality of push buttons each of which represent a differing toll amount. For example, a passenger vehicle may be required to pay 25¢ while a commercial vehicle may pay 50¢. It has been found that surreptitious practices may exist in systems of this type. A dishonest toll collector may collect a larger amount and register the collection of a lesser amount while withholding the difference for his own personal use. The present invention provides a means wherein the toll collector still registers the collection of the toll but, however, does not personally receive the monies from the vehicle driver and, accordingly, has no personal contact with the monies collected and, therefore, the aforesaid surreptitious practices can not occur.

Accordingly, one of the principal objects of the invention resides in the provision of a toll collection system having manually operative means to register the collection of a toll and having coin operated means cooperable with said manually operative means to establish the propriety of the toll registration.

Further, the present invention provides a signal system which is automatically controlled by the joint operation of the manual registration and automatic reception of the amount of toll registered. Thus, another object of the invention is to provide in a toll checking system, means to verify the proper collection of tolls and to automatically control the passage of vehicles paying said toll.

Still another object of the invention is to provide in a toll checking system, a key box having a plurality of push buttons therein which are individually depressible to register a differing toll rate and cooperable therewith, a coin receiving mechanism which counts the amount of toll monies deposited therein and correlates the amount with the toll rate push button that has been depressed.

Other ancillary objects will be, in part, hereinafter apparent and will be, in part, hereinafter pointed out.

In the drawings:

FIGURE 3 is a side elevation of a typical key box or classification register with the cover removed.

FIGURE 4 is a cross section, taken along line 4—4 of FIGURE 3.

FIGURE 5 is a fragmentary side elevation shown partially in cross section of a simple coin responsive switching device.

FIGURE 6 is a cross section, taken along line 6—6 of FIGURE 5.

FIGURE 7 is a fragmentary detail illustrating a coin responsive switch in a normally open position.

FIGURE 8 is a fragmentary detail illustrating a coin responsive switch in closed relationship.

The present invention is an improvement over the invention disclosed in applicant's copending application, Serial #495,992, filed March 22, 1955. In the cited copending application there is disclosed an automatic toll collecting system wherein a vehicle driver approaches a toll station and deposits a coin in an appropriate hopper which automatically controls the traffic signals accordingly, thereby permitting the vehicle driver to proceed through the toll station. Failure of the vehicle drivers to deposit the coin for the payment of the toll and the proceeding therethrough of the vehicle results in the actuation or the sounding of an alarm and/or the taking of a pictorial record of the violating vehicle. This system is completely described in the copending application and need not be described herein except for those portions which appertain to the present invention.

Essentially the present invention comprises a key box which permits the classification of differing vehicles and which presets the automatic toll collection equipment in accordance with a predetermined toll rate so that the vehicles which pay differing rates may continue to utilize the automatic toll collection equipment.

Figure 1:
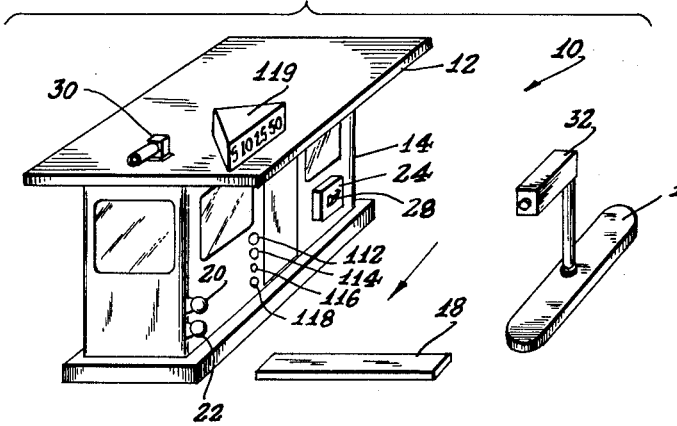
FIGURE 1 is an isometric projection of a typical toll barrier station utilizing the invention.
Figure 2:
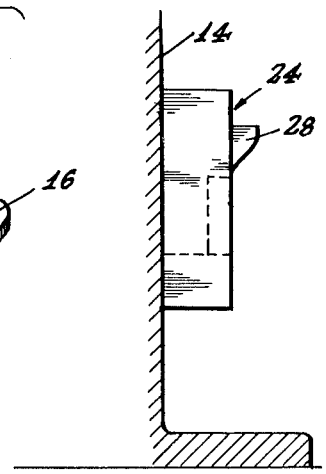
FIGURE 2 is a side elevation of a coin collector.

Referring to the drawings in detail, 10 generally designates a typical interchange which is provided at the entry of a toll facility. The interchange 10 generally comprises a canopy 12, mounted on a toll booth 14 and booth 14 is so disposed on the roadway so that vehicles desiring to utilize the roadway must pass alongside thereof, or in the event of a large interchange having many booths then the vehicles must pass therebetween. The passage in between the toll booth 14 and an island 16 is of such dimension that the vehicle is required to roll over a treadle switch 18, which is conventionally embedded in the roadway. Vehicles approaching the toll booth 14 in the direction of the arrow, shown in FIGURE 1, are controlled by the traffic signals 20 and 22. Traffic signal 20 is normally energized and is the red traffic signal and, accordingly, the vehicle must stop adjacent to the automatic toll collector 24, which is mounted on the toll booth 14. The automatic collector 24 is provided with a coin receiving hopper 28 which facilitates the depositing of the toll by the vehicle driver in the automatic toll collector 24. Upon the depositing of the proper amount of toll in the form of coins in the hopper 28 means hereinafter described in detail affects a change of signal lights to extinguish the red stop light and energize the green light 22, thus signalling the driver to proceed through the toll interchange.

The absence of a barrier, not shown, may tempt a vehicle driver to proceed through the toll facility without depositing the prescribed toll in the toll collector 24. In such an event means, hereinafter described in detail, effect the sounding of an audible alarm generally designated as 30 and concurrently therewith actuates the photograph recording device 32. Device 32 is a camera that has been specially developed and designed for recording equipment and is completely disclosed in Patent #2,736,630, issued February 28, 1956, to applicant.

As hereinbefore mentioned, a key box is provided to register and preset the automatic toll collector 24 to receive a predetermined amount of coins, which when received therein controls the traffic signals accordingly. As shown in FIGURE 3, a typical key box comprises a plurality of depressable plungers 40, 40a, 40b, etc., adapted to be manually depressed to close a normally open switch 42, 42a, 42b, etc. thereby. Such a key box is completely disclosed in applicant's Patent #2,622,138, issued December 16, 1952. As shown in FIGURE 4, it may be briefly stated that the plunger 40 is mounted on a slideable member 44 which carries an actuator 46 that is adapted to engage a toggle follower 48. Toggle follower 48 is part of a toggle mechanism generally designated as 50, which normally maintains the contacts of the associated switch 42, 42a, 42b, etc. in open relation. The depressing of the plunger 40 actuates the toggle mechanism 50 and permits switch 42 to close. Thus, it is established that a respective switch 42, 42a, 42b, etc. is associated with a respective depressable plunger 40, 40a, 40b, etc. and will be hereinafter described in detail.

Figure 9:
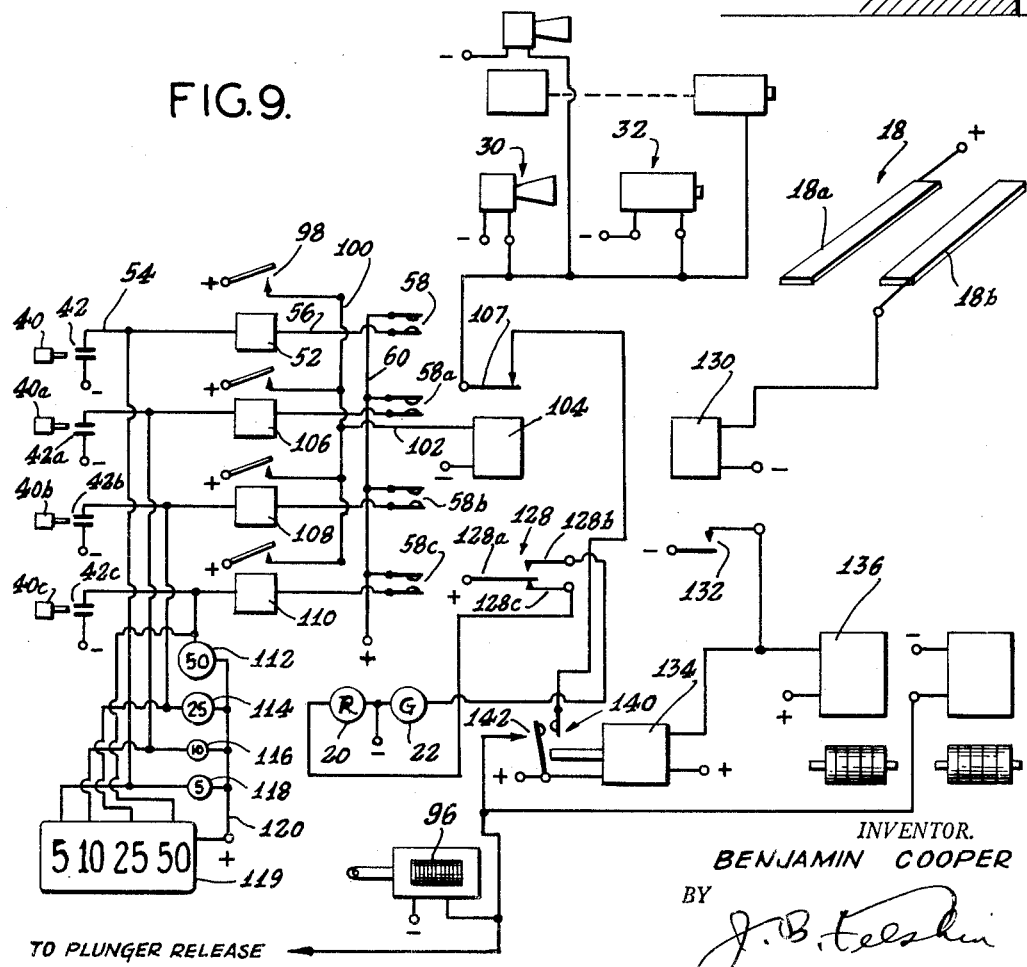
FIGURE 9 is a schematic wiring diagram of a toll collection system incorporating the invention.

Referring to FIGURE 9, there is shown a schematic diagram wherein the plungers 40, 40a, 40b, 40c are disposed with the associated switches 42, 42a, 42b, etc. in open relationship. Let us assume that plunger 40 is designated with the amount five (5¢) cents while plunger 40a is designated with the arbitrary amount of ten (10¢) cents and plunger 40b is designated with an arbitrary amount of twenty-five (25¢) cents and plunger 40c is designated for the amount of fifty (50¢) cents. Thus, the actuation or depression of plunger 40 effects the closing of switch 42 to supply a source of negative potential to one terminal of the coil of relay 52. This may be traced over the simple circuit, consisting of the following: From the source of negative potential through the closed switch 42 over the conductor 54 to the coil of relay 52. The other terminal of the coil of relay 52 is connected by conductor 56 to one contact of a normally open pair of contacts comprising a switch 58 which will be hereinafter described in detail. The other terminal of switch 58 is connected to conductor 60 which is in turn connected to a source of positive potential. Switch 58 is of the normally open type and only when closed by means hereinafter described will the relay 52 be energized.

It will be understood that a conventional coin actuated mechanism may be utilized, such as shown as component 57 in FIGURE 5, wherein the switches 58 merely control the coin handling mechanism in component 57. Coin handling mechanisms are readily available commercially in which differing combination of coins may be used to close switches, etc. For the purposes of this invention an extremely simple coin handling mechanism is hereinafter set forth.

Switches 58, 58a, 58b and 58c are associated with the coin collecting apparatus illustrated in FIGURE 5 and disposed in the automatic toll collector 24. The coins, upon being deposited in the hopper 24, are gravitationally fed into a channel member 70, by means not shown, but which, however, guide the coins in a vertical manner so that they must pass over or through appropriate slots 72, 74, 76 or 78. The slot 72 is of such dimension to receive therein a ten (10¢) cents coin and permits said coin to pass from the channel 70 into a vertical channel 80. Channel 80 is designed as a passageway leading from the channel 70 to a bank 90 disposed at the bottom thereof. In a like manner, the slot 74 is of such size to permit the passage therethrough of a five (5¢) cents coin and to communicate with a channel 82 which also terminates in the bank 90. Analogously, slot 76 communicates with a channel 84 which communicates with the bank 90 and slot 78 communicates with a channel 86 which similarly terminates in the bank 90. Disposed adjacent to the channels 82, 80, 84 and 86 are the switches 58, 58a, 58b or 58c respectively. Each of the switches 58, 58a, 58b, 58c, etc. generally comprises a pair of normally open contacts which are adapted to be closed by the weight of a coin. As shown in FIGURES 6, 7 and 8, a pivotal member 92, pivoted at 94, is disposed through an appropriate opening in the respective channel in such a manner that a coin passing through the channel engages the member 92 to pivot said member downwardly. A tension spring 93 interconnects one of the contacts of switch 58 with the pivotal member 92 and, accordingly, urges the normally open switch 58 into a closed relationship when a coin engages said pivotal member.

In the simple explanation illustrated in FIGURES 7 and 8, pivotal bail 95 limits the clockwise movement of the pivotal member 92 and thus retains the coin in engagement with the member 92. A solenoid 96, energized by means hereinafter described, pivots bail 95 out of engagement with the pivotal member 92, thereby permitting the weight of the coin to continue pivotal movement of the member 92 a sufficient distance to permit the coin to continue its gravitational drop through the respective channel into the bank 90.

Referring once more to the schematic diagram, the actuation or closing of the switch 58 energizes the relay 52 which in turn effects the closing of a normally open switch 98 associated therewith. Switch 98 has one contact thereof connected to a source of positive potential and the other contact thereof connected to a common conductor 100. Conductor 100 is in turn connected to a conductor 102, which is in turn connected to one terminal of the coil of a relay 104. The other terminal of the coil of the relay 104 is connected to a source of negative potential. Thus, the energization of relay 52 closes the switch 98 associated therewith, which in turn completes the circuit to energize the relay 104. In a like manner, the closing of a switch 58a, 58b or 58c by a related coin presets the circuit associated therewith; i.e., should the switch 58a be closed by the weight of a coin then the circuit to energize the relay 106 can only be completed upon the actuation of the plunger 40a. Similarly, the closure of the switch 58b by its related coin will energize relay 108 if the plunger 40b has been depressed and switch 42b associated therewith has been closed. Switch 58c controls relay 110 in a similar manner. It may be pointed out that associated with the circuits for the respective relays 52, 106, 108 and 110 are independent circuits which energize visible indicators. These visible indicators may be designated 112, 114, 116 and 118. The indicators 112, 114, 116 and 118 are mounted on the side of the toll booth 14 and when energized indicate to the vehicle driver the amount of toll that should be deposited in the hopper 28. It will be noted that upon the initial actuation of one of the plungers 40, 40a, 40b or 40c the associated indicator will be energized before the associated relay is energized. The circuits for the indicators are as follows: From a source of negative potential through the closed switch 42 over the conductors 54, to one terminal of an illuminating device 118 and from the other terminal of a device to a common source of positive potential 120. Similar circuits exist for the other indicators which are controlled by the respective switches 42a, 42b and 42c. Thus, it is obvious that the indicator will be energized upon the actuation of a respective plunger which will indicate to the driver that he must deposit the prescribed coin in the hopper 28. It will also be noted that only after he has deposited the proper and prescribed coin will he be able to proceed through the toll facility. The remaining portion of the circuit diagram illustrated in FIGURE 9 is substantially similar to that disclosed in the cited copending application and will be described but briefly herein.

Assuming that the proper coin has been deposited and the appropriate switch is closed, the energization of relay 104 opens the switch 107 associated therewith which disables the alarm circuit to alarm 30 and the energizing circuit to the camera recording equipment 32. Concurrently with the energization of relay 104 a switch 128 comprising a swinger and a pair of fixed contacts 128a, 128b, and 128c respectively is actuated. Swinger 128a is normally disposed in engaged relation with contact 128c which controls a circuit to energize the red traffic signal 20. Upon the energization of relay 104 swinger 128a disengages with the contacts 128c and engages the contact 128b which de-energizes the red signal and energizes the green signal 22. The vehicle then proceeds past the toll booth and in so doing the wheels of the vehicle roll over the treadle 18 thus closing the normally open contacts 18a and 18b therein. This completes a circuit to energize a relay 130 which has a pair of normally open contacts 132 associated therewith. Contacts 132, when closed, complete a circuit to time delay mechanism 134 and to a counter mechanism generally designated as 136. Time delay mechanism 134 is conventional in structure and well known to those skilled in the art and is of the type wherein the contacts 140 associated therewith are immediately closed upon the energizing thereof and upon de-energization, the delay mechanism 134 retains said contacts closed for a period of time. This period of time delay may be predetermined and of sufficient duration to permit the rear wheels of a vehicle to cross over the treadle before the contacts 140 have opened as a result of the time delay mechanism reaching the end of its time delaying cycle. The time delay mechanism 134 and the associated contacts 140 are provided so that a circuit is established for energizing the alarm apparatus 30 and/or the camera 32 should the relay 104 fail to energize. It will be noted that the relay 104 may only fail to energize upon the failure of the driver to deposit a coin, the wrong coin, or the failure of the collector to depress a plunger or a mismatch of the value of a deposited coin with the value representative of the depressed plunger.

Also associated with the time delay mechanism 134 is a pair of normally open contacts 142. The swinger contact of the contacts 140 is common to the contacts 142 and it will be noted that upon the de-energization of the time delay and the return of the time delay mechanism to normal, there is effected a momentary closing of the contacts 142 which in turn energizes the coin drop solenoid 96. As hereinbefore mentioned, solenoid 96 releases the bail 95 to permit the coins to drop into the bank 90 and further permits the switches 58 to return to their normally open relationship. In common with the energization of the solenoid 96, a circuit is completed, not shown, which effects the release of the depressed plunger. This circuit is disclosed in the key box patent and need not be described herein.

Thus, it is apparent that there has been provided a device in which the several objects of the invention are achieved and which is well adapted to meet the conditions of practical use.

While there has been shown and described a single embodiment of the invention, it is to be understood that modifications and changes might be made without departing from the scope of the present invention, except as limited by the claims.

The invention claimed is:

1. In a toll checking system for checking toll collections for a vehicle moving forwardly past a toll station, a plurality of coin receivers each to selectively receive a coin of different denomination, a plurality of coin switches each controlled by a coin deposited in one of said coin receivers, respectively, a circuit for each switch, a manual switch in each circuit in series with the coin switch of said circuit, a relay in each circuit in series with the manual and coin switches of said circuit, a relay switch controlled by each relay, a relay connected in parallel with each of said relay switches, a "stop" signal, a "go" signal, means to normally energize the "stop" signal, means controlled by said last relay, when said relay is energized by depositing a coin in a coin receiver associated with a circuit, the manual switch of which is in actuated condition, to deactuate the "stop" signal and actuate the "go" signal.

2. The combination of claim 1, in combination with means actuated by a vehicle moving forwardly past said station adapted to de-actuate the "go" signal and actuate the "stop" signal, said last named means being located at said station on the side of the coin receivers remote from the direction of an approaching vehicle, so that the vehicle operator may deposit a coin or coins in the receiver before the vehicle actuated means are operated.

3. In a toll checking system for checking toll collections for a vehicle moving forwardly in a lane past a toll station, in combination, traffic signals at said station, including a normally energized "stop" indicator and a normally de-energized "go" indicator, a plurality of coin receivers at said station, each of a different size so as to receive a different amount of money in coin or coins and each having switches therein, a plurality of selectively manually operable switches each being representative of a different amount of money and each associated with one of the coin receiver switches respectively, and circuit means connecting each manually operable switch and each coin receiver switch associated therewith to control said traffic signals to de-energize said "stop" indicator and to energize said "go" indicator when an amount of money in coins is dropped in said coin receiver corresponding to the selected manually operable switch that has been operated.

4. In a toll checking system including a plurality of coin receivers, each of a different size to receive a different amount of money in coin or coins, an alarm and means responsive to a vehicle passing said coin receivers to actuate said alarm upon failure of one of said amounts of money in coin or coins to be deposited in the coin receivers, the combination thereof with a switch for each coin receiver, a plurality of manually operable switches, one associated with each coin receiver switch selectively operable to preselect the amount of money in coin or coins that must be deposited in the coin receiver, circuit means connecting each manually operable switch and each receiver switch associated therewith to prevent operation of the alarm upon such amount being deposited in said receiver prior to actuation of said vehicle responsive means.

5. In a toll checking system for checking toll collections for a vehicle moving forwardly in a lane past a toll station, in combination, traffic signals at said station including a normally energized "stop" indicator and a normally de-energized "go" indicator, a plurality of coin receivers having switches therein at said station, each receiver being of a different size so as to selectively receive a different amount of money in coin or coins, a plurality of selectively, manually operated switches each representative of said different amounts of money, respectively, and each associated with one of the coin receiver switches, respectively, and circuit means connecting each manually operable switch and each coin receiver switch associated therewith to de-energize said "stop" indicator and to energize said "go" indicator when an amount of money in coins is dropped in a coin receiver corresponding to a selected manually operated switch that has been operated prior to entry of the vehicle into the station, and means actuated by the vehicle leaving said station adapted to energize the "stop" indicator and de-energize the "go" indicator.

6. In a toll checking system for checking toll collections for a vehicle moving forwardly in a lane past a toll station, an electrical circuit, a normally open vehicle actuated switch in said circuit, said switch being located at said station and adapted to be closed by a vehicle moving past said station, a plurality of coin receivers at said station, each of a different size so as to receive a different amount of money in coin or coins, said receivers being located in advance of said vehicle actuated switch so that the operator of a vehicle moving forwardly in the lane reaches the coin receivers before advancing the vehicle in the lane further to a position where said vehicle will close said vehicle actuated switch, an electrically operated camera connected in said circuit positioned to photograph vehicles which are in position to close the vehicle actuated switch, a plurality of coin operated switches each associated with a different one of said coin receivers, and each operated only by a certain set amount of money in coin or coins deposited in said associated receiver, a plurality of manually operated switches, each associated with one of said coin operated switches, respectively, means to actuate the camera upon closing of the vehicle actuated switch for photographing the vehicle if a coin operated switch and a manually operated switch associated therewith have not been operated prior to closing of the vehicle actuated switch, and means responsive to operation of one of the coin operated switches, and a manually operated switch associated therewith, in advance of closing of said vehicle actuated switch, to prevent actuation of said camera, so that it will not photograph the vehicle when the vehicle actuated switch is closed by said vehicle.

7. In a toll checking system for checking toll collections for a vehicle moving forwardly in a lane past a toll station, an electrical circuit, a normally open vehicle actuated switch in said circuit, said switch being located at said station and adapted to be closed by a vehicle moving past said station, a plurality of coin receivers at said station, each of a different size so as to receive a different amount of money in coin or coins, said receivers being located in advance of said vehicle actuated switch so that the operator of a vehicle moving forwardly in the lane reaches the coin receivers before advancing the vehicle in the lane further to a position where said vehicle will close said vehicle actuated switch, an electrically operated alarm connected in said circuit, a plurality of coin operated switches each associated with a different one of said coin receivers, and each operated only by a certain set amount of money in coin or coins deposited in said associated receiver, a plurality of manually operated switches, each associated with one of said coin operated switches, respectively, means to actuate the alarm upon closing of the vehicle actuated switch if a coin operated switch and a manually operated switch associated therewith have not been operated prior to closing of the vehicle actuated switch, and means responsive to operation of one of the coin operated switches, and a manually operated switch associated therewith, in advance of closing of said vehicle actuated switch, to prevent actuation of said alarm, so that it will not operate when the vehicle actuated switch is closed.

References Cited in the file of this patent

UNITED STATES PATENTS

| | | |
|---|---|---|
| 2,279,936 | Brodie | Apr. 14, 1942 |
| 2,622,138 | Cooper | Dec. 16, 1952 |
| 2,683,870 | Cooper | July 13, 1954 |
| 2,769,165 | Bower | Oct. 30, 1956 |